(12) United States Patent
Chu et al.

(10) Patent No.: US 9,292,432 B2
(45) Date of Patent: Mar. 22, 2016

(54) GARBAGE COLLECTION METHOD FOR FLASH MEMORY

(71) Applicant: Silicon Motion, Inc., Jhubei, Hsinchu County (TW)

(72) Inventors: Po-Chia Chu, Kaohsiung (TW); Yu-Chih Lin, New Taipei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 77 days.

(21) Appl. No.: 14/452,767

(22) Filed: Aug. 6, 2014

(65) Prior Publication Data

US 2015/0261671 A1    Sep. 17, 2015

(30) Foreign Application Priority Data

Mar. 12, 2014 (TW) .............................. 103108601 A

(51) Int. Cl.
*G06F 12/02* (2006.01)

(52) U.S. Cl.
CPC .... *G06F 12/0246* (2013.01); *G06F 2212/7211* (2013.01)

(58) Field of Classification Search
None
See application file for complete search history.

(56) References Cited

U.S. PATENT DOCUMENTS

| 2012/0005406 | A1 | 1/2012 | Hutchison et al. | |
|---|---|---|---|---|
| 2012/0054414 | A1* | 3/2012 | Tsai | G06F 12/0246 711/103 |
| 2012/0268991 | A1* | 10/2012 | Chiao | G11C 16/349 365/185.11 |
| 2013/0311698 | A1* | 11/2013 | Cheng | G06F 12/0246 711/103 |
| 2015/0113206 | A1* | 4/2015 | Fitzpatrick | G11C 16/3495 711/103 |

FOREIGN PATENT DOCUMENTS

| TW | 201245960 | 11/2012 |
|---|---|---|
| TW | 201349099 | 12/2013 |

* cited by examiner

*Primary Examiner* — Daniel Tsui
(74) *Attorney, Agent, or Firm* — McClure, Qualey & Rodack, LLP

(57) ABSTRACT

A garbage collection method for a flash memory is provided. The flash memory includes a spare block pool and a data block pool, wherein the spare block pool includes spare blocks and the data block pool includes data blocks. The method includes the steps of: receiving target data from a host and writing the target data to a current data block of the data blocks; sorting an erase count of each data block when performing a wear-leveling process to write the target data; sorting a valid page number of each first block when it is determined that at least two first blocks in the data blocks have the smallest erase count; and selecting a second block having a smallest valid page number from the first blocks and writing valid pages of the second block to one of the spare blocks to perform a data cleaning process.

10 Claims, 3 Drawing Sheets

GARBAGE COLLECTION METHOD FOR FLASH MEMORY

CROSS REFERENCE TO RELATED APPLICATIONS

This Application claims priority of Taiwan Patent Application No. 103108601, filed on Mar. 12, 2014, the entirety of which is incorporated by reference herein.

BACKGROUND OF THE INVENTION

1. Field of the Invention

The present invention relates to a flash memory, and in particular, to a data storage device having a flash memory and a garbage collection method for a flash memory.

2. Description of the Related Art

Flash memory is a common non-volatile data storage device, which can be erased and programmed electrically. For example, an NAND flash memory is usually for use in a memory card, a USB flash device, a solid-state disk (SSD), an embedded multimedia card, etc.

A storage array of a flash memory may comprise a plurality of blocks, and each block comprises a plurality of pages. When a used block is to be released as a spare block, all pages of the used block have to be erased in the operation. The technique of garbage collection is used to move the valid data located in various blocks to a spare space, so that the blocks only contain invalid data and can be erased and released as spare blocks.

However, a lot of resources and computations are required when using conventional garbage collection methods, resulting in incapability of performing a wear-leveling process on flash memory.

BRIEF SUMMARY OF THE INVENTION

A detailed description is given in the following embodiments with reference to the accompanying drawings.

In an exemplary embodiment, a data storage device is provided. The data storage device is coupled to a host. The data storage device comprises: a flash memory, comprising a spare block pool, and a data block pool, wherein the spare block pool comprises a plurality of spare blocks, and the data block pool comprises a plurality of data blocks; and a controller, receiving target data from the host and writing the target data to a current data block of the plurality of data blocks, wherein when the controller determines that a wear-leveling process needs to be performed to write the target data, the controller sorts an erase count of each data block, wherein when the controller determines that no two blocks in the data blocks simultaneously have the same smallest erase count, the controller further determines whether the difference of the erase count corresponding to at least one first block in the data blocks and the smallest erase count is less than a first threshold value, wherein when the difference between the erase count corresponding to at least one first block in the data blocks and the smallest erase count is less than a first threshold value, the controller selects a second block having a smallest valid page number from the at least one first block to perform a data cleaning process, thereby writing valid pages of the second block to one of the spare blocks.

In another exemplary embodiment, a garbage collection method for a flash memory is provided. The flash memory is coupled to a host, and the flash memory comprises a spare block pool and a data block pool, wherein the spare block pool comprises a plurality of spare blocks and the data block pool comprises a plurality of data blocks. The garbage collection method comprises the steps of: receiving target data from the host and writing the target data to a current data block of the data blocks; sorting an erase count of each data block when performing a wear-leveling process to write the target data; determining whether the difference of the erase count corresponding to at least one first block in the data blocks and the smallest erase count is less than a first threshold value when it is determined that none of any two blocks in the data blocks have the smallest erase count simultaneously; and selecting a second block having a smallest valid page number from the at least one first block to perform a data cleaning process, thereby writing valid pages of the second block to one of the spare blocks when the difference between the erase count corresponding to at least one first block in the data blocks and the smallest erase count is less than a first threshold value.

In yet another exemplary embodiment, a data storage device is provided. The data storage device is coupled to a host. The data storage device comprises: a flash memory, comprising a spare block pool, and a data block pool, wherein the spare block pool comprises a plurality of spare blocks, and the data block pool comprises a plurality of data blocks; and a controller, receiving target data from the host and writing the target data to a current data block of the plurality of data blocks, wherein when the controller determines that a wear-leveling process is to be performed to write the target data, the controller sorts an erase count of each data block, wherein when the controller determines that at least two blocks in the data blocks have the smallest erase count simultaneously, the controller further sorts a valid page number of each first block, selects a second block having the smallest valid page number from the first blocks, and writes valid pages of the second block to one of the spare blocks to perform a data cleaning process.

In yet another embodiment, a garbage collection method for a flash memory is provided. The flash memory is coupled to a host, and the flash memory comprises a spare block pool and a data block pool, wherein the spare block pool comprises a plurality of spare blocks and the data block pool comprises a plurality of data blocks. The garbage collection method comprises the steps of: receiving target data from the host and writing the target data to a current data block of the data blocks; sorting an erase count of each data block when performing a wear-leveling process to write the target data; sorting a valid page number of each first block when it is determined that at least two first blocks in the data blocks have the smallest erase count simultaneously; and selecting a second block having a smallest valid page number from the at least two first blocks and writing valid pages of the second block to one of the spare blocks to perform a data cleaning process.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
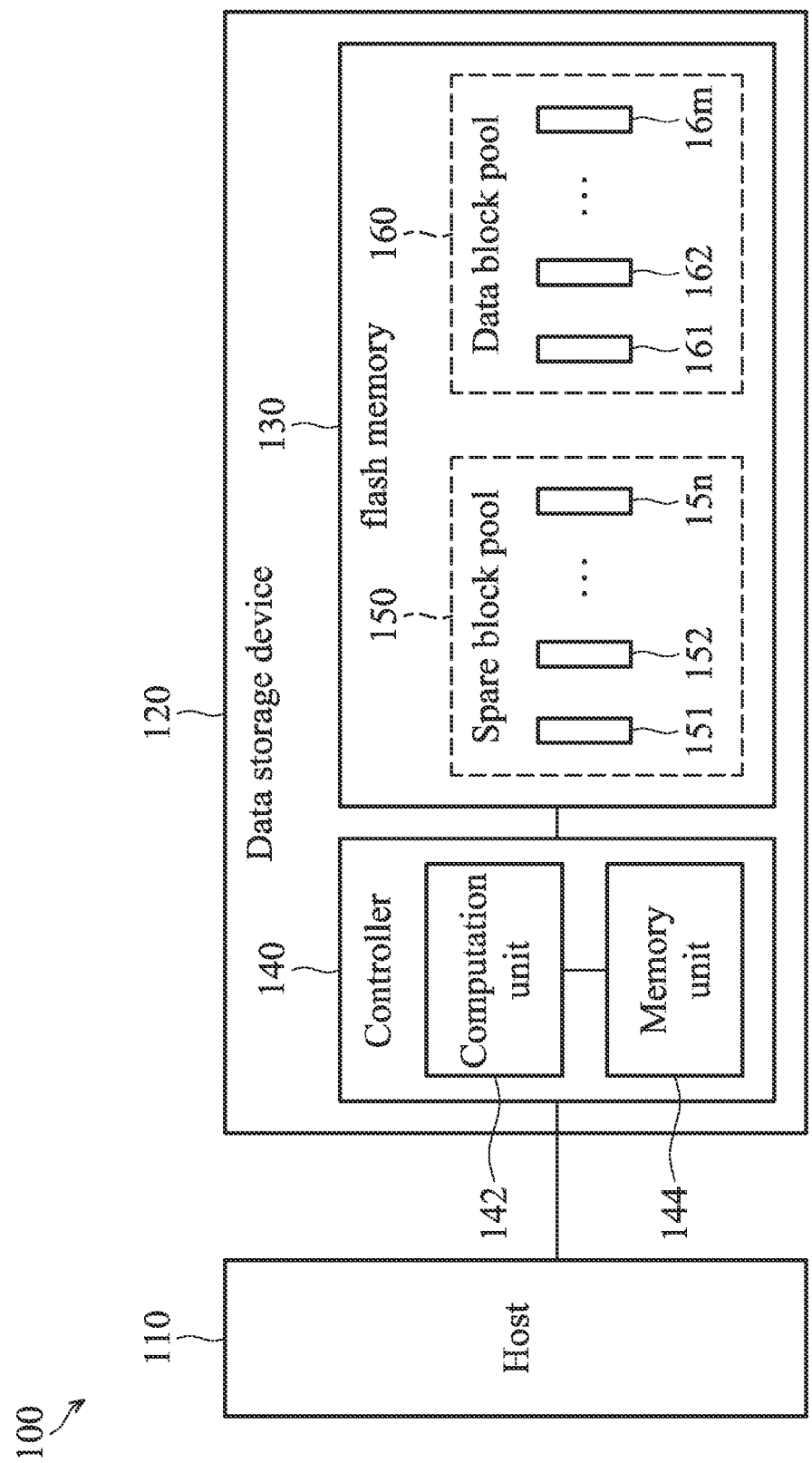
FIG. 1 is a block diagram of an electronic device in accordance with an embodiment of the invention.

FIG. 1 is a block diagram of an electronic device in accordance with an embodiment of the invention. The electronic device 100 may comprise a host 110 and a data storage device 120. The data storage device 120 may comprise a flash memory 130 and a controller 140, wherein the controller 140 may control access to the flash memory 130 according to the commands from the host 110. The controller 140 may comprise a computation unit 142 and a memory unit 144 (e.g. a read-only memory (ROM)). The program codes and data stored in the memory unit 144 may be firmware executed by the computation unit 142, so that the controller 140 may control the flash memory 130 based on the firmware. The flash memory 130 may comprise a plurality of blocks, and each block comprises a plurality of pages.

In an embodiment, the flash memory 130 may comprise a spare block pool 150, and a data block pool 160. The spare block pool 150 comprises a plurality of spare blocks 151~15n for storing invalid data. The data block pool 160 comprise a plurality of data blocks 161~16m for storing data. In an embodiment, the controller 140 may manage the blocks of the flash memory 130 according to the commands from the host 110. A block in the flash memory 130 is assigned based on a physical address, and the host 110 may assign a block based on a logical address. Accordingly, the controller 140 has to convert the logical address from the host 110 to a physical address. In an embodiment, the controller 140 may record the relationship between the logical addresses and physical addresses into an address link table.

In an embodiment, each of the data blocks 161~16m may comprise a plurality of pages. When data is stored in a page of the data blocks, the page can be regarded as a data page. When the page has a corresponding logical address, the page can be regarded as a valid page. In an embodiment, the controller 140 may calculate the number of total valid pages in each of the data blocks 161~16m to obtain a valid page number, and record the valid page number of the data blocks 161~16m to a valid number table. In addition, the erase count of each block may indicate the number of erasing operations performed on the block. In an embodiment, the controller 140 may record the erase count of each block in the flash memory 130 in an erase count table. In an embodiment, the flash memory 130 may further comprise the valid number table and the erase count table (not shown in FIG. 1).

In an embodiment, when the host 110 writes data to the data storage device 120 consecutively, the number of valid spare blocks in the spare block pool 150 of the flash memory 130 may be small. Afterwards, the host 110 may further read data of several pages from the data storage device 120 repeatedly, and re-supply power to the data storage device 120 after interrupting power to the data storage device 120 (i.e. power cycling). When a power cycling operation occurs, the controller 140 may determine whether the number of spare blocks is lower than a threshold value. When the number of spare blocks is lower than the threshold value, the controller 140 may start performing garbage collection.

Specifically, before starting to perform garbage collection, the controller 140 has to determine a clean source block from the data blocks, and determine a clean destination block from the spare blocks. When determining the clean source block, the controller 140 may sort the erase count of each block, and select the block having the smallest erase count as the clean source block. If there are several blocks having the smallest erase count simultaneously, the controller 140 may select the first block having the smallest erase count in the order. However, if the selected clean source block has too many valid pages, the spare blocks obtained in the garbage collection operation may be fewer. In the worst case, the controller 140 has to perform many garbage collection operations to obtain a complete spare block, resulting in low performance of the data storage device 120.

In another embodiment, when determining the clean source block, the controller 140 may sort the erase count of each block, and select the block having the smallest erase count as the clean source block. If there are several blocks having the smallest erase count simultaneously, the controller 140 may further sort the blocks having the smallest erase count based on their valid page number, and select the block having both the smallest erase count and smallest valid page number as the clean source block. Accordingly, the block having a larger number of valid pages will be less likely selected, and the garbage collection operation may become more effective, resulting in better performance of the wear leveling process.

In yet another embodiment, when determining the clean source block, the controller 140 may sort the erase count of each block, and select the block having the smallest erase count as the clean source block. If there are several blocks having the smallest erase count simultaneously, the controller 140 may further sort the blocks having the smallest erase count based on their valid page number. The difference between the embodiment and the aforementioned embodiment is that the controller 140 may firstly select several first blocks, wherein the difference of the erase count of the selected first blocks and the smallest erase count of the blocks is less than a threshold value (e.g. 3). Afterwards, the controller 140 may sort the valid page number of the selected first blocks, and select a second block having the smallest valid page number from the selected first blocks as the clean destination block, resulting in more effective garbage collection.

Figure 2A:
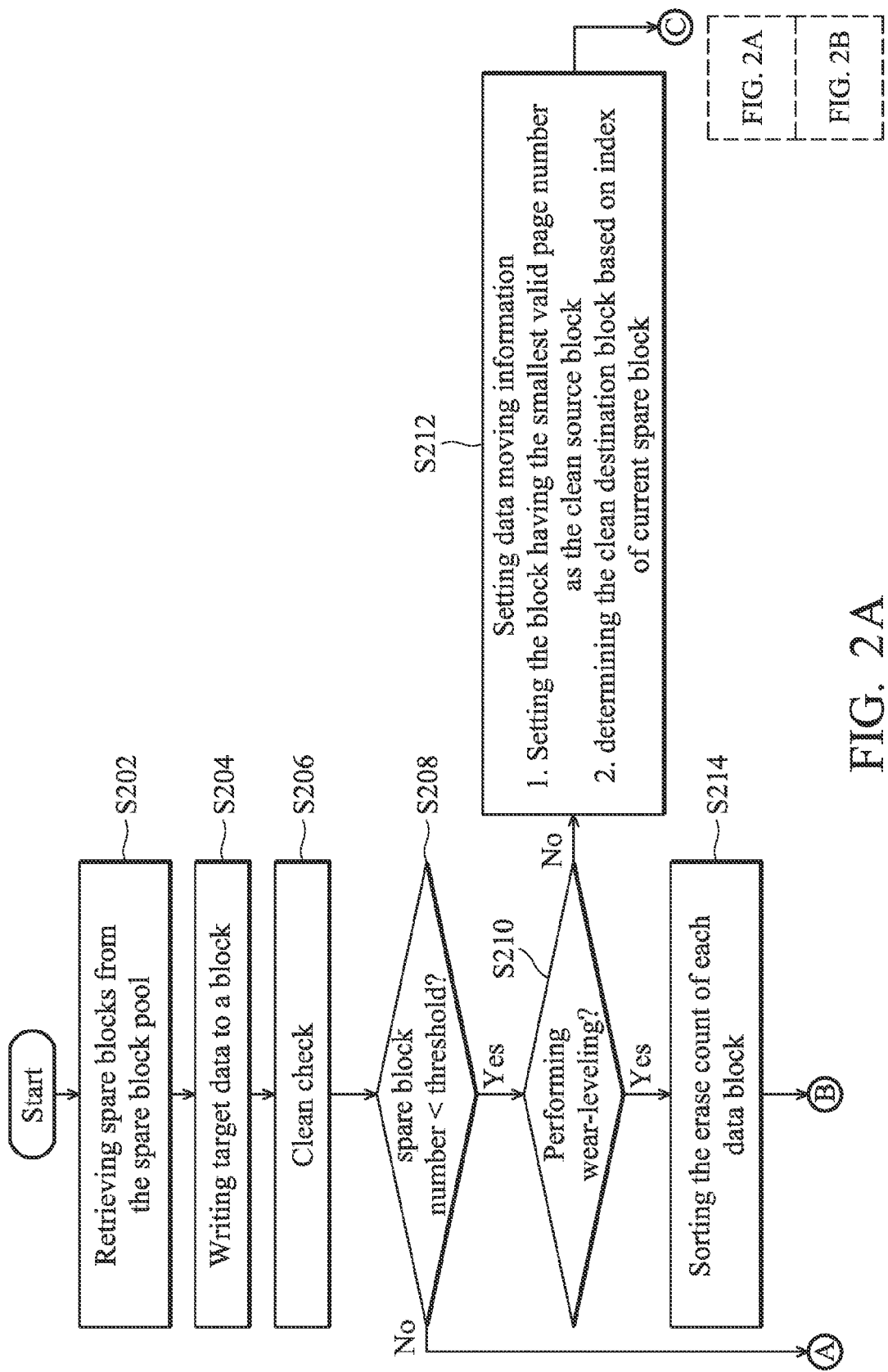
FIGS. 2A and 2B are portions of a flow chart illustrating a garbage collection method of a flash memory in accordance with an embodiment of the invention.
Figure 2B:
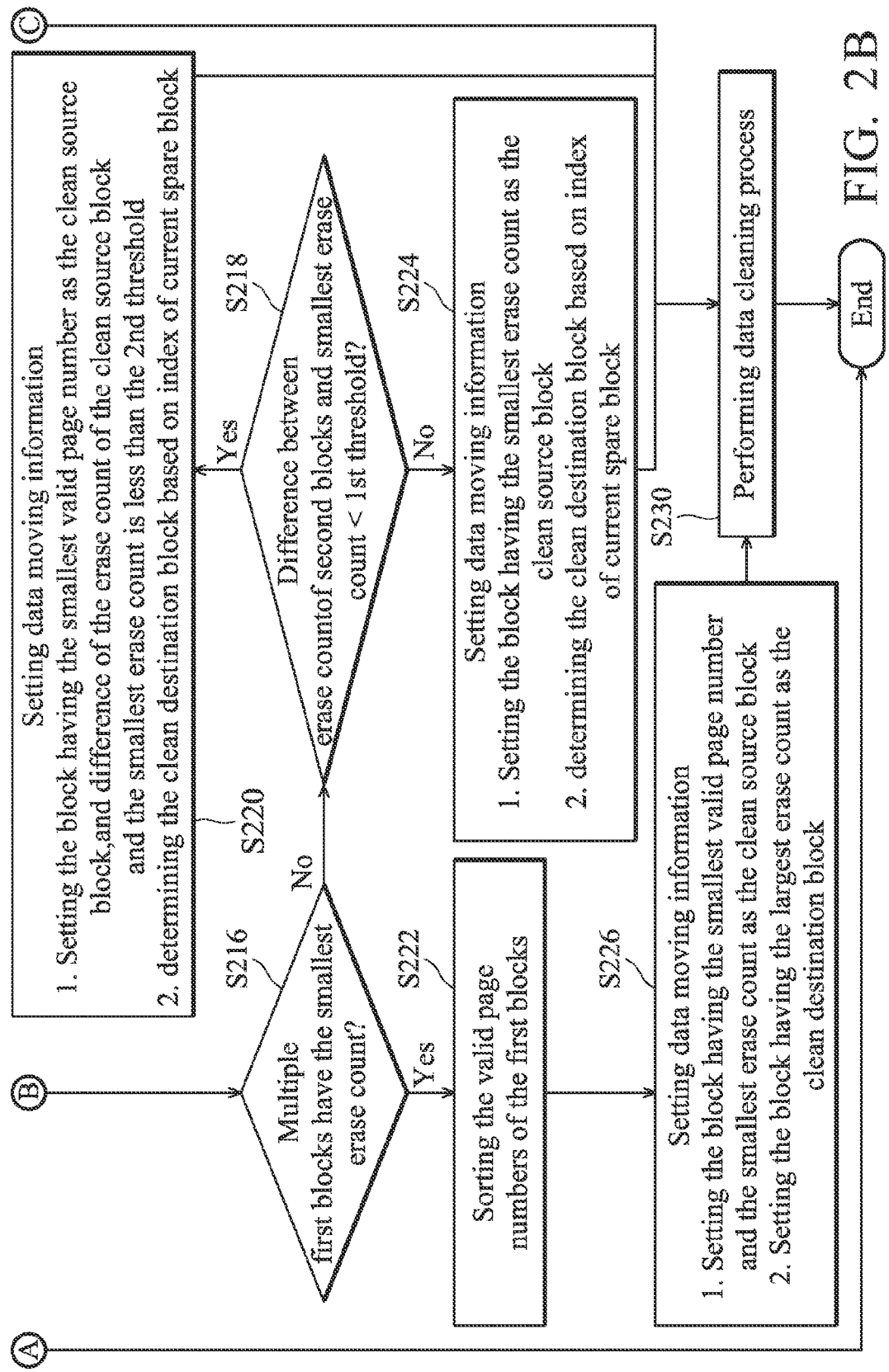

FIGS. 2A and 2B are portions of a flow chart illustrating a garbage collection method of a flash memory in accordance with an embodiment of the invention. As illustrated in FIG. 2A and FIG. 2B, in step S202, the controller 140 may retrieve at least one spare block from a spare block pool. In step S204, the controller 140 may receive the data sent from the host 110, and write the data into a current data block. In step S206, the controller may perform a clean check operation to check the data storage status of each block in the flash memory. In step S208, the controller 140 may determine whether the number of spare blocks is less than a first threshold value. If so, step S210 is performed. Otherwise, the flow ends. In step S210, the controller 140 determines whether to perform a wear-leveling process. If so, step S214 is performed. Otherwise, step S212 is performed. In step S212, the controller 140 may set data moving information for the wear-leveling process, wherein the data moving information is determined by selecting the block having the smallest valid page number as the clean source block, and the clean destination block is determined by using the block index. In step S214, the controller 140 may sort the erase count of each block of the flash memory 130 in an ascending order. In step S216, the controller 140 may determine whether multiple first blocks have the same smallest erase count. If so, step S222 is performed. Otherwise, step S218 is performed.

In step S218, the controller may determine whether the difference of the erase count of at least one first block and the smallest erase count of the blocks is less than a second threshold value. If so, step S220 is performed. Otherwise, step S224 is performed. In step S220, the controller 140 may set the data moving information for the wear-leveling process, wherein the data moving information comprises the clean source block having the smallest valid page number, and the difference of the erase count of the clean source block and the smallest erase count is less than the second threshold value, and the clean destination block is determined by the index of the current spare block. In step S222, the controller 222 may order the valid page number of each first block in an ascending order. In step S224, the controller 140 may set the data moving information for the wear-leveling process, wherein the data moving information comprises a clean source block having the smallest erase count, and the clean destination block is determined by the index of the current spare block.

In step S226, the controller 140 may set the data moving information for the wear-leveling process, wherein the data moving information comprises a clean source block having the smallest valid page number and the smallest erase count, and the block having the largest erase count is determined as the clean destination block. In step S230, the controller 140 may perform a data cleaning process to move data in the flash memory 130 based on the data moving information.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, coupled to a host, the data storage device comprising:
   a flash memory, comprising a spare block pool, and a data block pool, wherein the spare block pool comprises a plurality of spare blocks, and the data block pool comprises a plurality of data blocks; and
   a controller, receiving target data from the host and writing the target data to a current data block of the plurality of data blocks,
   wherein when the controller determines that a wear-leveling process is to be performed to write the target data, the controller sorts an erase count of each data block,
   wherein when the controller determines that no two blocks among the data blocks simultaneously have the same smallest erase count, the controller further determines whether the difference of the erase count corresponding to at least one first block in the data blocks and the smallest erase count is less than a first threshold value,
   wherein when the difference between the erase count corresponding to at least one first block in the data blocks and the smallest erase count is less than a first threshold value, the controller selects a second block having a smallest valid page number from the at least one first block to perform a data cleaning process, thereby writing valid pages of the second block to one of the spare blocks.

2. The data storage device as claimed in claim 1, wherein when the controller determines that the wear-leveling is not to be performed to write the target data, the controller selects a third block having the smallest valid page number from the data blocks to perform the data cleaning process.

3. The data storage device as claimed in claim 1, wherein when the difference between the erase count of the at least one first block and the smallest erase count is not less than the first threshold value, the controller selects a fourth block having the smallest erase count from the data blocks to perform the data cleaning process.

4. The data storage device as claimed in claim 1, wherein before the controller selects the second block, the controller sorts a valid page number of each first block.

5. A garbage collection method for a flash memory, wherein the flash memory is coupled to a host, and the flash memory comprises a spare block pool and a data block pool, wherein the spare block pool comprises a plurality of spare blocks and the data block pool comprises a plurality of data blocks, the method comprising:
   receiving target data from the host and writing the target data to a current data block of the data blocks;
   sorting an erase count of each data block when performing a wear-leveling process to write the target data;
   determining whether the difference of the erase count corresponding to at least one first block in the data blocks and the smallest erase count is less than a first threshold value when it is determined that none of any two blocks in the data blocks have the smallest erase count simultaneously; and
   selecting a second block having a smallest valid page number from the at least one first block to perform a data cleaning process, thereby writing valid pages of the second block to one of the spare blocks when the difference between the erase count corresponding to at least one first block in the data blocks and the smallest erase count is less than a first threshold value.

6. The method as claimed in claim 5, further comprising:
   selecting a third block having the smallest valid page number from the data blocks to perform the data cleaning process when the controller determines that the wear-leveling is not to be performed to write the target data.

7. The method as claimed in claim 5, further comprising:
   selecting a fourth block having the smallest erase count from the data blocks to perform the data cleaning process when the difference between the erase count of the at least one first block and the smallest erase count is not less than the first threshold value.

8. The method as claimed in claim 5, wherein before selecting the second block, the method further comprises:
   sorting a valid page number of each first block.

9. A data storage device, coupled to a host, the data storage device comprising:
   a flash memory, comprising a spare block pool, and a data block pool, wherein the spare block pool comprises a plurality of spare blocks, and the data block pool comprises a plurality of data blocks; and
   a controller, receiving target data from the host and writing the target data to a current data block of the plurality of data blocks,
   wherein when the controller determines that a wear-leveling process is to be performed to write the target data, the controller sorts an erase count of each data block,
   wherein when the controller determines that at least two first blocks in the data blocks have the smallest erase count simultaneously, the controller further sorts a valid page number of each first block, selects a second block having the smallest valid page number from the first blocks, and writes valid pages of the second block to one of the spare blocks to perform a data cleaning process.

10. A garbage collection method for a flash memory, wherein the flash memory is coupled to a host, and the flash memory comprises a spare block pool and a data block pool, wherein the spare block pool comprises a plurality of spare blocks and the data block pool comprises a plurality of data blocks, the method comprising:
    receiving target data from the host and writing the target data to a current data block of the data blocks;

sorting an erase count of each data block when performing a wear-leveling process to write the target data;
sorting a valid page number of each first block when it is determined that at least two first blocks in the data blocks have the smallest erase count simultaneously; and
selecting a second block having a smallest valid page number from the at least two first blocks and writing valid pages of the second block to one of the spare blocks to perform a data cleaning process.

* * * * *